Sept. 5, 1967 R. S. HOWE, JR 3,339,991
ANTI-SPIN SELF-LOCKING OUTER BEARING RING
Filed May 7, 1965 2 Sheets-Sheet 1

INVENTOR.
RALPH S. HOWE, Jr.
BY
Hopgood & Calimafde
ATTORNEYS.

INVENTOR.
RALPH S. HOWE, Jr.
BY
Hopgood & Calimafde
ATTORNEYS.

United States Patent Office 3,339,991
Patented Sept. 5, 1967

3,339,991
ANTI-SPIN SELF-LOCKING OUTER
BEARING RING
Ralph S. Howe, Jr., 74 Hickory Hill Road,
New Britain, Conn. 06052
Filed May 7, 1965, Ser. No. 453,947
6 Claims. (Cl. 308—194)

ABSTRACT OF THE DISCLOSURE

An anti-spin, self-locking outer bearing ring for use in combination with a pillow block, housing or similar bearing support is disclosed. The outer bearing ring has a convex outer surface adapted to mate concentrically with, for example, the bore of a pillow block. This may be achieved by employing an annular locking cam on the outer peripheral edge of one face of the outer ring adjacent the convex surface thereof, which annular locking cam is eccentric relative to the concentric diameter of the ring. A corresponding annular mating cam is located on a corresponding inner peripheral edge of the housing adjacent the concave surface thereof, the corresponding cam also being eccentric relative to the concentricity of the bore of the housing. The mating surfaces of the cams are convexed such that the contact force arising out of the coaction of the housing with the outer ring is directed substantially within the width of the bearing ring, whereby the outer ring is locked relative to the bore of the housing.

---

This invention relates to a self-locking outer ring of an antifriction bearing and, in particular, to the combination of a housing, such as a pillow block, and an anti-friction bearing mounted therein having an outer ring which is self-locking relative to the housing.

Antifriction bearings assembled in separately mounted housings, such as pillow blocks and flange cartridges, generally comprise inner and outer rings with antifriction bearing elements interposed between the rings, the periphery of the outer ring being spherically contoured to mate with the spherical concave surface of the bore of the housing in order to provide self-alignment. The fit between the outer ring and the housing is made snug in order to keep the outer ring from spinning. However, under centrifugal or rotating load conditions, which may prevail due to unbalance in fan wheels, chopper shafts, or other types of rotors, the outer ring tends to spin in the housing. This leads to vibration of the assembly and other problems which adversely affect the life of the bearings.

I have found that I can overcome this problem by modifying the structure of the outer ring and the bore of the housing so as to render the outer ring self-locking relative to the bore of the pillow block and, hence resistant to spinning.

It is an object of this invention to provide an outer bearing ring which is self-locking relative to the bore of a housing.

Another object is to provide the combination of a housing and an antifriction bearing wherein the outer bearing ring is self-locking relative to the bore of the housing.

These and other objects will more clearly appear when taken in conjunction with the following disclosure and the accompanying drawings, wherein.

In its broad aspects, the outer bearing ring has a convex outer surface which is preferably spherically contoured, although it may be cylindrically contoured, the outer diameter of the ring being concentric with the bore. The pillow block housing may be a one piece structure as shown in FIG. 1, or comprise a two piece structure of sheet metal as described, for example, in U.S. Patent No. 2,796,304.

Figure 1:
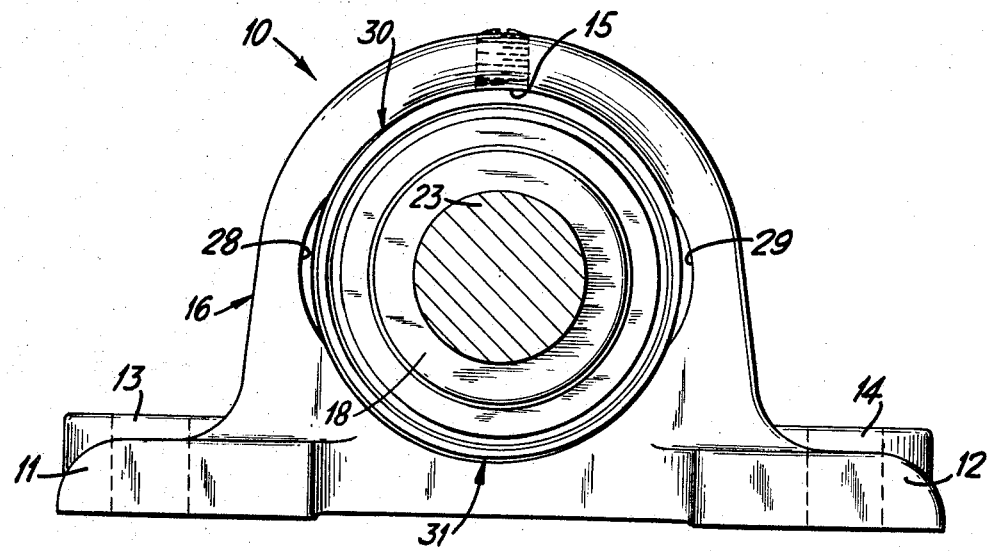
FIGS. 1 and 2 are illustrative of a housing, in this case a pillow block, and antifriction bearing combination.
Figure 2:
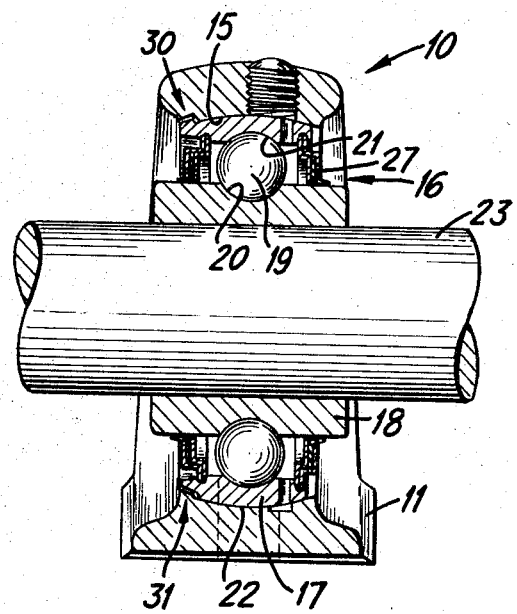

Referring to FIGS. 1 and 2, the pillow block designated generally by the number 10 has a pair of outstanding feet 11, 12 with bolt-receiving holes 13, 14 for mounting the pillow block or housing onto a supporting surface. The pillow block has a spherically contoured bore 15 in which an antifriction bearing is mounted designated generally by the numeral 16 (note FIG. 2). The bearing is formed of an outer ring 17 and an inner ring 18 with a complement of antifriction bearing elements 19 interposed therebetween, the bearing elements lying in opposed annular raceway grooves 20, 21 of the inner and outer rings, respectively. The outer ring preferably has a spherically contoured outer surface 22 which mates substantially with the spherical inner surface 15 of the pillow block. As shown in FIG. 2, the inner bearing ring 18 has a bore through which shaft 23 passes, the ring being mounted to the shaft via means, press fit or other locking device, to prevent slipping. Seals or shields 27 are employed for retaining lubricant in the bearing. In mounting the bearing assembly in the pillow block, slots 28, 29 (FIG. 1) may be provided for slipping the assembly into the bore of the block as will be described with regard to FIG. 4. As will be appreciated, slots would not be required where the pillow block is constructed of two parts.

In providing a self-locking outer ring in accordance with my invention, one face of the ring has on its outer peripheral edge adjacent the convex surface an annular locking cam eccentrically disposed at the face relative to the concentric bore of the ring. A corresponding mating cam is provided adjacent to the concave inner surface of the pillow block, the mating cam also being eccentric relative to the concentric bore of the pillow block. The cam arrangement is shown generally at 30, 31 of FIG. 2 and in greater detail in FIGS. 3 to 5 to be described hereinafter.

Figure 3:
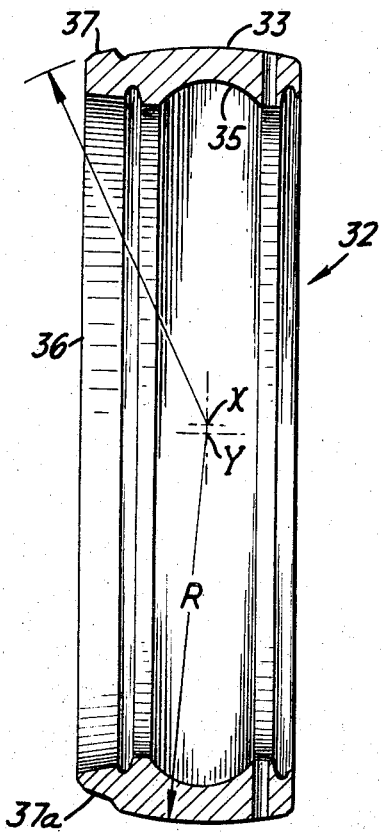
FIG. 3 depicts in cross section an outer ring showing in detail the locking configuration disposed about the outer periphery of one face of the ring.

Referring to FIG. 3, an outer bearing ring 32 is shown having a spherically contoured outer surface 33 and an annular raceway groove 35 for receiving antifriction bearing elements therein. At one face 36 of the outer ring, an annular locking cam portion 37 is provided at its outer peripheral edge adjacent spherical surface 33 having a breakout diameter greater than the spherical diameter of the ring referred to the center of the ring, the cam being eccentrically disposed at face 36 relative to the concentricity of the bore of the ring. The cam is contoured such that substantially diametrically opposite cam portion 37 and for 180° or more the cam portion 37a is smaller than the projected spherical diameter or radius R of the outer ring at the ring face. This is necessary to allow assembly of the spherical outer ring within the pillow block. The radial eccentricity of the annular cam may be based on a center X (note FIG. 3) shifted slightly above the concentric center Y of the bore, for example shifted about one-thirty secondth of an inch above true center for an outer bearing ring having an outside diameter in the neighborhood of about 2.9 inches. As stated hereinabove, the pillow block has an annular mating cam corresponding substantially dimensionally with the cam of outer ring 32, the cam being similarly eccentrically located relative to the bore of the bearing assembly.

Figure 4:
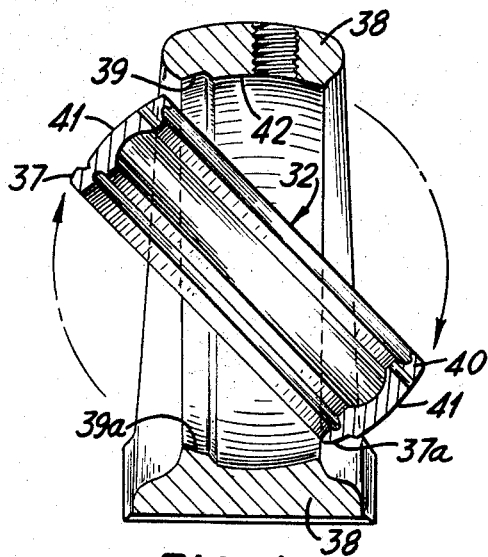
FIG. 4 shows the outer bearing ring of the type depicted in FIG. 3 being mounted within the bore of a pillow block.

Referring to FIG. 4, the pillow block 38 is shown generally having corresponding cam portions 39, 39a with which cam portions 37, 37a substantially mate prior to rotation of the ring to lock it in place.

The desirable feature of the cam is that the normal direction of force on the ring developed during eccentric engagement with the corresponding cam of the pillow block is towards the geometric center of the ring so that overturn or misalignment moment on the ring is avoided. This is achieved by making the cam surface spherical in contour with the radial center coincident or almost coincident with the center of the ring as shown in FIG. 3. Of course, it will be appreciated that the cam surface need not be exactly spherical. For instance, cam portions 37, 37a may be bevelled to approximately a straight line, with the bevel perpendicular to the radius passing through substantially the center of the ring.

As stated hereinbefore, to allow assembly of the outer ring (having the spherical outer convex surface) into the pillow block housing, the outer ring cam diameter for a given eccentricity must be such that for 180° or more the cam surface should be smaller than the projected spherical diameter or radius of the ring at its face. Referring to FIG. 4, in mounting the outer ring, the end 40, where the cam is radially smaller (note 37a) than the breakout diameter or radius of the spherical surface of the ring at the ring face, is inserted through the opening of pillow block 38 via slots 28, 29 (FIG. 1) and then swivelled clockwise as shown in FIG. 4 to cause spherical surface 41 of the outer ring to slide into and engage spherical surface 42 of the bore of the pillow block. Cam portion 37 enters into and mates substantially with cam portion or groove 39 of the pillow block. Similarly, smaller cam portion 37a mates substantially with the upwardly projecting cam portion 39a of the pillow block. Where the clearance between cams is close, the mating cam surfaces should have spherical diameters roughly the same as the ring diameter to allow the ring to swivel in place.

Figure 5:
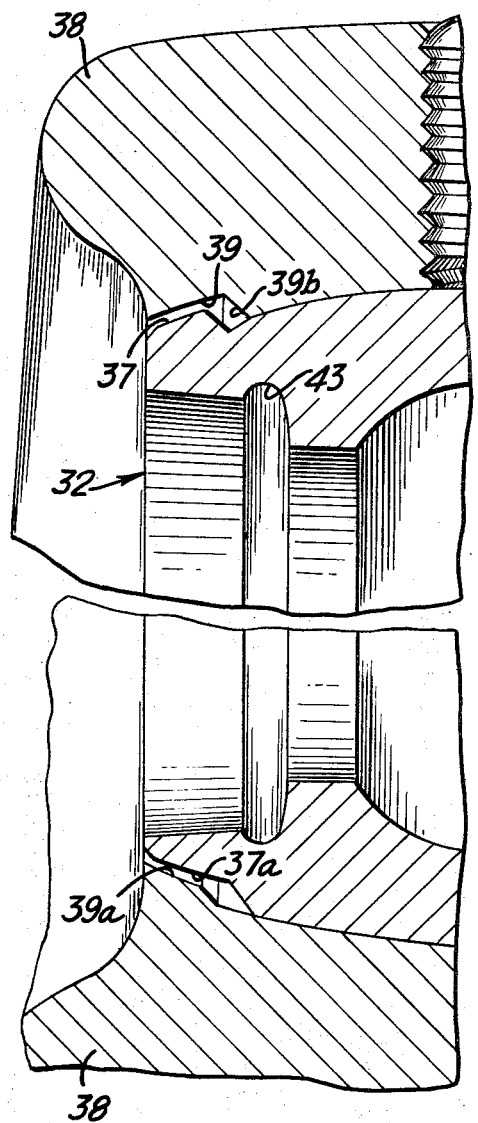
FIG. 5 is a fragmentary drawing showing in detail the locking means of the outer bearing ring relative to a mating locking means in the bore of the housing with which it cooperates to inhibit spinning of the outer ring.

In order to show more clearly the mating of the camming surfaces, reference is made to FIG. 5 which is a fragmentary representation of the pillow block and the outer bearing ring mounted therein. The annular groove 43 shown is a seal retaining groove. Referring to mating camming surfaces 37, 39 and mating camming surfaces 37a, 39a, it will be noted that the camming groove of the pillow block is deeper (39b) than the inboard extremity of the cam 37 of the outer ring. Similarly, cam 37a of the ring is deeper relative to cam 39a of the pillow block. This is desirable as it provides a space to allow adequate self-alignment of the outer ring relative to the pillow block housing.

An important feature of the invention is that the prevention of spinning is not dependent upon maintaining tightness of fit between the outer bearing ring and the housing. Thus, the fit between the outer ring and the housing may be loose to allow self-alignment without restraint from friction between the ring and the housing.

Tests have confirmed the effectiveness of the antispinning device. After the bearing with the specially configurated outer ring was assembled within the housing and the whole mounted about a shaft and the shaft rotated under unbalanced load conditions the outer ring tended to rotate opposite to the direction of shaft rotation. The ring was only able to rotate within the pillow block housing for about 60° at which point the cams engaged with each other without further rotation of the outer ring occurring. In a test with a conventional outer ring, the ring would continually creep and move within the pillow block housing. In contradistinction, the outer ring of the invention appeared to lock itself positively without hunting or vibrating.

While the present invention has been described in conjunction with a preferred embodiment, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. In the combination of a housing and an antifriction bearing mounted therein comprising outer and inner rings having antifriction bearing elements interposed therebetween, said outer ring having a convex outer surface concentric with the bore thereof and said housing having an inner concave surface which mates concentrically with the convex surface of the outer ring, the improvement comprising an annular locking cam on the outer peripheral edge of one face of said outer ring adjacent the convex surface thereof, which annular locking cam is eccentric relative to the concentric diameter of the ring, said annular locking cam having a convex surface, and a mating annular locking cam located on a corresponding inner peripheral edge of the housing adjacent the concave surface thereof, which mating cam is eccentric relative to the concentricity of the bore, the convex mating surfaces of the cams being such that the contact force arising out of coaction of the housing with the outer ring is directed substantially within the width of the bearing ring, whereby the outer ring is lockable relative to the bore of the housing by coaction of the eccentrically positioned locking cams.

2. In the combination of a housing and an antifriction bearing mounted therein comprising outer and inner rings having antifriction bearing elements interposed therebetween, said outer ring having a spherically contoured outer surface concentric with the bore thereof, the housing having an inner spherical surface which mates concentrically with the spherical surface of the outer ring, the improvement comprising an annular locking cam on the outer peripheral edge of one face of said outer ring adjacent the spherical surface thereof, which annular locking cam is eccentric relative to the concentric diameter of the ring, said annular locking cam having a spherical surface and a mating annular locking cam correspondingly located on the inner peripheral edge of the housing adjacent the spherical surface thereof, which mating cam is eccentric relative to the concentricity of the bore, the spherical mating surfaces of the cams being such that the contact force arising out of the coaction of the housing with the outer ring is directed toward approximately the center of the outer ring, whereby the outer ring is lockable relative to the bore of the housing by coaction of the eccentrically positioned locking cams.

3. The combination of claim 2 wherein the diameter of the annular cam of the outer ring for a given eccentricity is such that for at least 180° of the ring circumference the radial projection of the cam is less than the spherical radius of the outer periphery of the ring projected to its face.

4. The combination of claim 2 wherein a lateral annular space is provided between the cam of the housing and the cam of the outer ring sufficient to allow for self alignment of the outer ring.

5. An outer bearing ring having a spherical outer surface concentric with the bore of said ring, one face of said ring having on its outer peripheral edge adjacent the spherical surface an annular locking cam eccentrically disposed relative to the concenric outer diameter of the ring, the surface of the cam being convexed such that a radius perpendicular to the surface passes substantially through the center of the ring.

6. An outer bearing ring as in claim 5 wherein the diameter of the annular cam for a given eccentricity is such that for at least 180° of the ring circumference, the radial projection of the cam is less than the spherical radius of the outer periphery of the ring projected to its face.

References Cited

UNITED STATES PATENTS

| 2,679,983 | 6/1954 | Happe | 308—236 |
| 2,728,616 | 12/1955 | Potter | 308—236 |
| 2,829,933 | 4/1958 | Brusca | 308—194 |

MARTIN P. SCHWADRON, *Primary Examiner.*

FRANK SUSKO, *Examiner.*